(12) United States Patent
Sesia et al.

(10) Patent No.: US 11,100,559 B2
(45) Date of Patent: Aug. 24, 2021

(54) RECOMMENDATION SYSTEM USING LINEAR STOCHASTIC BANDITS AND CONFIDENCE INTERVAL GENERATION

(71) Applicant: Adobe Inc., San Jose, CA (US)

(72) Inventors: Matteo Sesia, Stanford, CA (US); Yasin Abbasi Yadkori, San Francisco, CA (US)

(73) Assignee: Adobe Inc., San Jose, CA (US)

(*) Notice: Subject to any disclaimer, the term of this patent is extended or adjusted under 35 U.S.C. 154(b) by 483 days.

(21) Appl. No.: 15/940,736

(22) Filed: Mar. 29, 2018

(65) Prior Publication Data

US 2019/0303994 A1    Oct. 3, 2019

(51) Int. Cl.
*G06Q 30/06* (2012.01)
*G06Q 30/02* (2012.01)

(52) U.S. Cl.
CPC ..... *G06Q 30/0631* (2013.01); *G06Q 30/0201* (2013.01); *G06Q 30/0254* (2013.01)

(58) Field of Classification Search
CPC ......... G06Q 30/00–08; G06Q 30/0631; G06Q 30/0201; G06Q 30/0254
See application file for complete search history.

(56) References Cited

U.S. PATENT DOCUMENTS

2011/0184806 A1* 7/2011 Chen ............... G06Q 30/02 705/14.52
2018/0336645 A1* 11/2018 Price ............... H04L 51/32

OTHER PUBLICATIONS

Abbasi-Yadkori,"Improved Algorithms for Linear Stochastic Bandits", In Advances in Neural Information Processing Systems, Dec. 2011, 19 pages (Year: 2011).*

A contextual-bandit approach to personalized news article recommendation. Lihong Li, Wei Chu, John Langford, Robert Elias Schapire. WWW '10: Proceedings of the 19th international conference on World wide web. Apr. 2010 pp. 661-670https://doi.org/10.1145/1772690.1772758. (Year: 2010).*

Improvements to the Linear Programming Based Scheduling of Web Advertisements. Nakamura, Atsuyoshi; Abe, Naoki.Electronic Commerce Research, suppl. World Wide Web Electronic Commerce, Security and Privacy; New York vol. 5, Iss. 1, (Jan. 2005): 75-98. Retrieved via ProQuest (Year: 2005).*

(Continued)

*Primary Examiner* — Michael Misiaszek
(74) *Attorney, Agent, or Firm* — FIG. 1 Patents

(57) ABSTRACT

Recommendation systems and techniques are described that use linear stochastic bandits and confidence interval generation to generate recommendations for digital content. These techniques overcome the limitations of conventional recommendations systems that are limited to a fixed parameter to estimate noise and thus do not fully exploit available data and are overly conservative, at a significant cost in operational performance of a computing device. To do so, a linear model, noise estimate, and confidence interval are refined by a recommendation system based on user interaction data that describes a result of user interaction with items of digital content. This is performed by comparing a result of the recommendation on user interaction with digital content with an estimate of a result of the recommendation.

20 Claims, 6 Drawing Sheets

(56) References Cited

OTHER PUBLICATIONS

Efficient ensemble bandit techniques for personalized news recommendation. Bixler, Michael. Stevens Institute of Technology, ProQuest Dissertations Publishing, 2016. 10113760. (Year: 2016).*

Learning to Search and Recommend from Users Implicit Feedback. Zhao, Tong. The Chinese University of Hong Kong Aug. 2018. ProQuest Dissertations Publishing, 2019. 13837793. (Year: 2018).*

Adaptive Preference Learning With Bandit Feedback: Information Filtering, Dueling Bandits and Incentivizing Exploration. Bangrui Chen. Dec. 2017. Cornell University. ProQuest Dissertations Publishing, 2017. 10680541. (Year: 2017).*

Learning to surf: Multiagent systems for adaptive Web page recommendation. Balabanovic, Marko.Stanford University, ProQuest Dissertations Publishing, 1998. 9837173. (Year: 1998).*

Abbasi-Yadkori,"Improved Algorithms for Linear Stochastic Bandits", In Advances in Neural Information Processing Systems, Dec. 2011, 19 pages.

Audibert,"Variance estimates and exploration function in multi-armed bandit", Apr. 2007, 37 pages.

\* cited by examiner

RECOMMENDATION SYSTEM USING LINEAR STOCHASTIC BANDITS AND CONFIDENCE INTERVAL GENERATION

BACKGROUND

Recommendation systems may be used to form recommendations to guide user interaction and navigation with digital content via a computing device. Examples include recommendations regarding which article to read by a user, which advertisement to include in a webpage, digital movies for viewing, and so forth. To do so, recommendation systems may incorporate a notion of a "reward," such as a desired user interaction caused by the recommendation, such as to read the article, conversion of a good or service, consumption of a digital movie, and so on. In this way, the notion of the reward is used by the recommendation system to model the desired user interaction and thus the goal of the recommendation to improve user interaction with the computing device.

One example of a technique used by a recommendation system to generate recommendations is referred to as a multi-armed bandit. This technique is configured to address allocation of a fixed limited set of resources (e.g., digital content) through use of recommendations in a way to maximize the reward. In this technique, the recommendation system is modeled as a gambler that makes a decision regarding which slot machine in a collection of slot machines to play, how many times to play each slot machine, in which order to play the slot machines, and whether to continue with a current machine or to try a different machine. Each machine provides a random reward based on a probability distribution specific to that machine. Thus, the objective of the recommendation system as the gambler is to maximize a sum of rewards earned through a series of recommendations by identifying which machines (i.e., items of digital content) are to be subject of the user interaction.

In order to generate the recommendation, the recommendation system employs a linear model. This linear model is configured to generate an estimate a likely effect of causing the desired user interaction for the digital content, i.e., to estimate the likely reward. This estimation is based on features that represent the digital content and user interaction data that describes user interaction with digital content as a linear function in order to generate the recommendation.

In practice, however, a linear model is typically not capable of generating recommendations with perfect accuracy as a result of randomness and also because an observed reward in some instance is not an exact linear function of the features, i.e., includes an unpredictable component. To address this in conventional recommendation systems, a noise estimate is assumed to be a random part of the reward that cannot be predicted, and is smaller than a threshold. This threshold is set conservatively in conventional techniques as a fixed value that does not change and is higher than a true noise value. As a result, conventional techniques ensure that the "true" noise value is contained within the estimate through use of the fixed estimate. However, this limits performance of the conventional techniques in that exploitation is limited and thus limits accuracy of the recommendation system over time, thereby resulting in inefficient use of computing resources and thus operation a computing device that implements the conventional recommendation system.

SUMMARY

Recommendation systems and techniques are described that use linear stochastic bandits and confidence interval generation to generate recommendations for digital content. These techniques overcome the limitations of conventional recommendations systems that are limited to a fixed parameter to estimate noise and thus do not fully exploit available data and are overly conservative, at a significant cost in operational performance of a computing device. To do so, a linear model, noise estimate, and confidence interval are refined by a recommendation system based on user interaction data that describes a result of user interaction with items of digital content. This is performed by comparing a result of the recommendation on user interaction with digital content with an estimate of a result of the recommendation.

By updating the confidence interval, the recommendation system may take into account a tradeoff between exploration and exploitation, which is not possible using conventional techniques. In exploration, the recommendation of digital content is generated to improve knowledge about the linear relationship between the feature vector and the reward. In exploitation, the recommendation of digital content is generated to maximize effectiveness in achieving the desired user interaction. This tradeoff involves balancing a goal of generating the recommendation of digital content that is most effective and determining which recommendation of digital content is most effective. By balancing this tradeoff, the recommendation system may maximize a summed "reward" (i.e., the desired user interactions) in an manner with increased computational efficiency over conventional fixed techniques.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
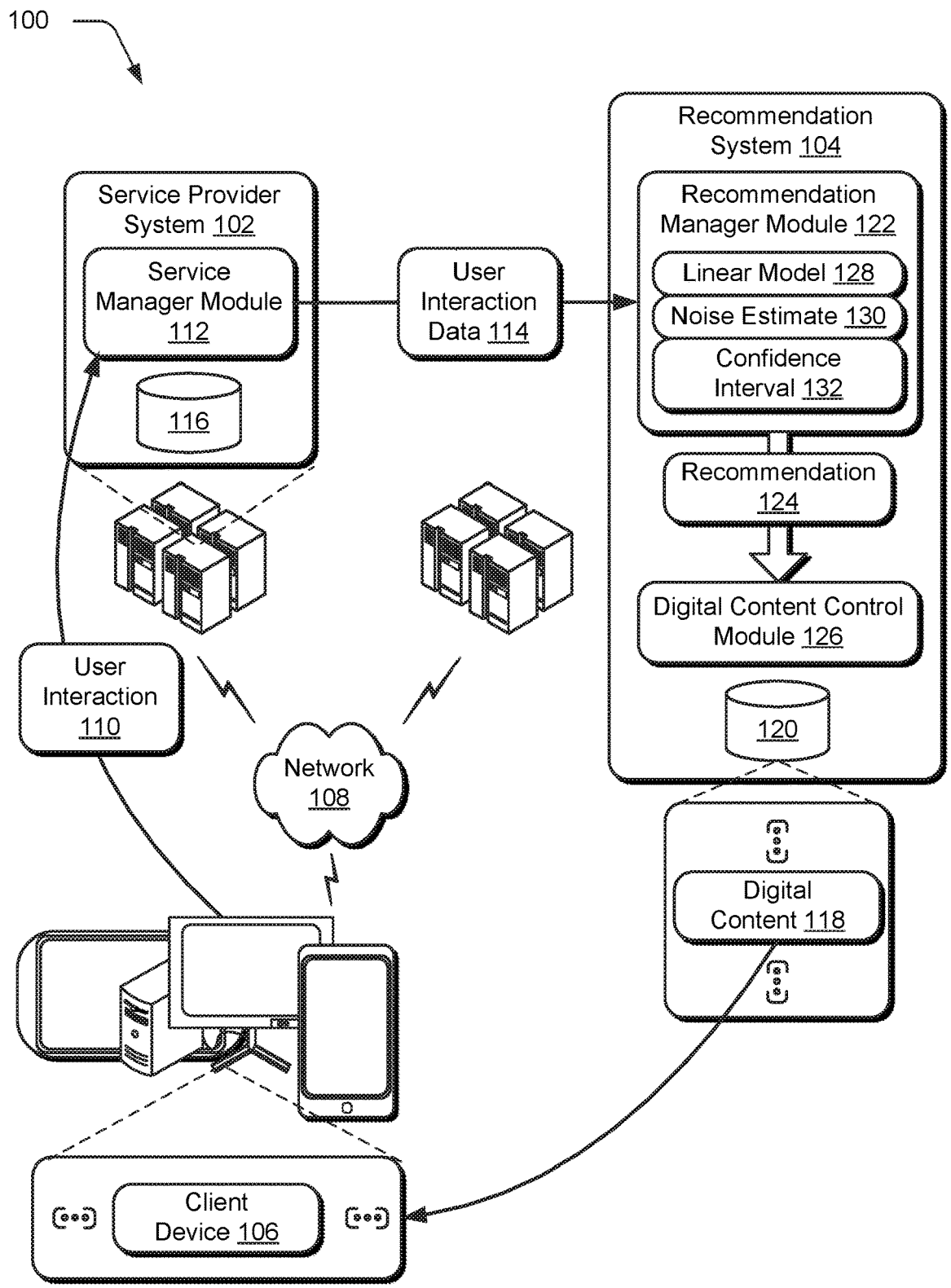
FIG. 1 is an illustration of an environment in an example implementation that is operable to employ recommendation system techniques described herein.

In conventional recommendation systems that employ multi-bandit techniques, a noise estimate is assumed to be a random part of a reward that cannot be predicted, and is set smaller than a threshold. This threshold is set conservatively in conventional techniques as a fixed value that does not change and is higher than a true noise value in order to ensure that the true noise value is included within the interval. However, this limits performance in that exploitation is limited and thus does not make "good" recommendations as would otherwise be possible with a noise estimate that has increased accuracy.

Accordingly, techniques are described in which a recommendation system employs a linear stochastic bandit technique that is based on confidence intervals of a reward that is to be obtained by making a recommendation. To do so, the recommendation system, at any point in time, selects a choice from a number of choices (e.g., items of digital content) using a linear model that is fit to user interaction data to describe past user interactions. This is used to obtain an estimate of what the reward would be for each of the items of digital content. These estimates are then used to generate the recommendation, which may also take into account exploration and exploitation. In order for these choices to be meaningful, a confidence interval is used to describe an amount of uncertainty in generating a noise estimate, i.e., a likelihood of accuracy of the noise estimate.

The noise estimate is generated and refined as user interaction data is received, e.g., in real time. There are two parts to this: (1) generating the noise estimate; and (2) generating a confidence interval indicating an amount of uncertainty of the noise estimate. This may be performed in a variety of ways, such as through linear regression in which past predictions and observed rewards are leveraged. This includes examining a difference between the predicted estimates of rewards made to generate the recommendations and the user interaction data describing an actual result of those recommendations on achieving the reward, i.e., the desired user interaction. A standard deviation described by this difference (e.g., a mean-square distance) is used as the noise estimate, because the noise estimate is the part of the reward that cannot be explained, otherwise.

In order to generate the confidence interval, the recommendations system may use a technique involving self-normalizing martingales that is used to estimate a quantity that is normalized by the inputs. This may be performed in a variety of ways, an example of which is described as "Improved Algorithms for Linear Stochastic Bandits" by Yasin Abbasi-Takhori et al, *In Proceedings of the $24^{th}$ International Conference on Neural Information Processing Systems*, NIPS'11, pages 2312-2320, USA, 2011, Curran Associates Inc., the entire disclosure of which is hereby incorporated by reference.

In this way, the confidence interval and noise estimate define a confidence interval for the reward for each of the items of digital content. This enables the recommendation system to generate the recommendation as choosing which of the items has the highest upper bound in the reward of its confidence interval. As a result, the recommendation system may make the most optimistic choice by looking at each option (i.e., item of digital content) and optimistically choose the one that has the highest potential of yielding a high reward. As that option is chosen, the reward is obtained and added to the user interaction data to guide subsequent recommendation generation. As a result, the techniques described herein improve accuracy in generating the recommendations and thus improve operational efficiency of a computing device that employs these techniques.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Term Examples

A "multi-armed bandit" refers to a technique is configured to address allocation of a fixed limited set of resources (e.g., digital content) through use of recommendations in a way to maximize the reward. In this technique, the recommendation system is modeled as a gambler that makes a decision regarding which slot machine in a collection of slot machines to play, how many times to play each slot machine, in which order to play the slot machines, and whether to continue with a current machine or to try a different machine. Each machine provides a random reward based on a probability distribution specific to that machine. Thus, the objective of the recommendation system as the gambler is to maximize a sum of rewards earned through a series of recommendations by identifying which machines (i.e., items of digital content) are to be subject of the user interaction.

"Digital content" refers to any type of data that is configured to be rendered for output by an output device of a computing device to a user. Examples of digital content include digital images, digital audio, digital media, digital video, digital articles, digital text, and so forth. Digital marketing content is a type of digital content that is configured to promote conversion of a good or service, e.g., "click" on an ad, purchase of a good or service, and so forth.

"Recommendations" are a suggestion or proposal as to a best course of action to achieve a desired result, e.g., the "reward" in the multi-armed bandit technique. In a digital content context, recommendations may identify which item of digital content is likely to achieve a desired result, e.g., conversion for digital marketing content.

"Linear models" describe a continuous response variable as a function of one or more predictor variables. Linear regression is a statistical method used to create a linear model.

A "noise estimate" a noise estimate is assumed to be a random part/component of a reward incorporated within the linear model as part of a multi-bandit problem that cannot be predicted.

A "confidence interval" is a range of values so defined that there is a specified probability a true value of a parameter lies within it. The confidence level of a noise estimate defines an amount of uncertainty that a true noise value is included within the noise estimate.

Example Environment

FIG. 1 is an illustration of a digital medium environment 100 in an example implementation that is operable to employ recommendation generation and digital content control techniques described herein. The illustrated environment 100 includes a service provider system 102, a recommendation system 104, and a plurality of client devices, an example of which is illustrated as client device 106. These devices are communicatively coupled, one to another, via a network 108 and may be implemented by a computing device that may assume a wide variety of configurations.

A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, although a single computing device is shown, a computing device may be representative of a plurality of different devices, such as multiple servers utilized by a business to perform operations "over the cloud" as shown for the service provider system 102 and the recommendation system 104 and as further described in FIG. 6.

The client device 106 is illustrated as engaging in user interaction 110 with a service manager module 112 of the service provider system 102. The service provider system 102, for instance, may be configured to support user interaction with digital content 118. User interaction data 114 is then generated (e.g., by the service manager module 112) that describes this user interaction 110, which may be stored in a storage device 116.

Digital content 118 may take a variety of forms and thus user interaction 110 with the digital content 118 may also take a variety of forms. For example, a user of the client device 106 may read an article of digital content 118, view a digital video, listen to digital music, view posts and messages on a social network system, and so forth. In another example, the digital content 118 is configured as digital marketing content to cause conversion of a good or service, e.g., by "clicking" an ad, purchase of the good or service, and so forth. Digital marketing content may also take a variety of forms, such as electronic messages, email, banner ads, posts, and so forth. Accordingly, digital marketing content is typically employed to raise awareness and conversion of the good or service corresponding to the content. In another example, user interaction 110 and thus generation of the user interaction data 114 may also occur locally on the client device 106.

The user interaction data 114 is received by a recommendation system 104, which employs this data to control output of the digital content 118 to the client device 106. To do so, a recommendation manager module 122 generates a recommendation 124 configured to control which items of the digital content 118 are output to the client device 106, e.g., directly via the network 108 or indirectly via the service provider system 102, by the digital content control module 126. The recommendation 124, for instance, may be configured to specify which article of digital content 118 is to be transmitted to the client device 106 via the service provider system 102. In another example, the recommendation 124 identifies which item of digital marketing content is to be served as part of a webpage. In a further example, the recommendation 124 forms the item of digital content 118, itself, such as to recommend digital videos, the recommendation is then selectable to cause output of those videos. Thus, although the digital content 118 is illustrated as maintained in the storage device 120 by the recommendation system 104, this content may also be maintained and managed by the service provider system 102, the client device 106, and so forth.

The recommendation system 104 is configured to maximize an effectiveness of the digital content 118 on causing a user interaction by a user of the client device 106, i.e., a "reward." The reward, for instance, may include reading of an article, listening to a song in digital audio, watching a digital video, conversion of digital marketing content, and so forth. To do so, the recommendation manager module 122 leverages information about the user interaction data 114 and information about the digital content 118 to estimate effectiveness of each of the items of digital content 118 in achieving the desired user interaction as the "reward" for exposing the digital content 118.

In the techniques described herein, the recommendation manager module 122 employs a linear model 128, which is configured to estimate a likely effect of causing the desired user interaction for the digital content 118. This estimation is based on features that represent the digital content 118 and the user interaction data 114 as a linear function in order to generate the recommendation 124. As part of this, the recommendation manager module 122 generates an unknown coefficient vector referred to as "θ," which describes a linear relationship between a feature vector "x" and a reward "y," which is the effectiveness in achieving the desired user interaction. In other words, "y" is a linear function of "x" through this unknown parameter vector "θ."

In order to generate the recommendation 124, the recommendation manager module 122 is configured to address a tradeoff between exploration and exploitation. In exploration, the recommendation of digital content 118 is generated to improve knowledge about the linear relationship between the feature vector and the reward. In exploitation, the recommendation 124 of digital content 118 is generated to maximize effectiveness in achieving the desired user interaction. This tradeoff involves balancing a goal of generating the recommendation 124 of digital content 118 that is most effective and determining which recommendation 124 of digital content 118 is most effective. Thus, in some instances it may be desirable to generate a recommendation 124 for sub-optimal digital content 118 (i.e., is less effective) to learn more about the linear relationship between the feature vector and the reward and thus increase a likelihood of accuracy of the recommendation 124.

In practice, a linear model 128 is typically not capable of generating perfect recommendations 124 as a result of randomness, because an observed reward might not be an exact linear function of the features (i.e., includes an unpredictable component), and so forth. To address this, the recommendation manager module 122 is also configured to generate a noise estimate 130 and a confidence interval 132 of that noise estimate 130 as an online variance estimation for use as part of a linear stochastic bandits technique. The confidence interval 132 indicates an amount of uncertainty of the noise estimate 130.

In conventional techniques, the noise estimate is assumed to be a random part of the reward that cannot be predicted, and is smaller than a threshold. This threshold is set conservatively in conventional techniques as a fixed value that does not change and is higher than a true noise value. However, this limits performance in that exploitation is limited and thus does not make "good" recommendations as would otherwise be possible with a noise estimate 130 that has increased accuracy.

Figure 2:
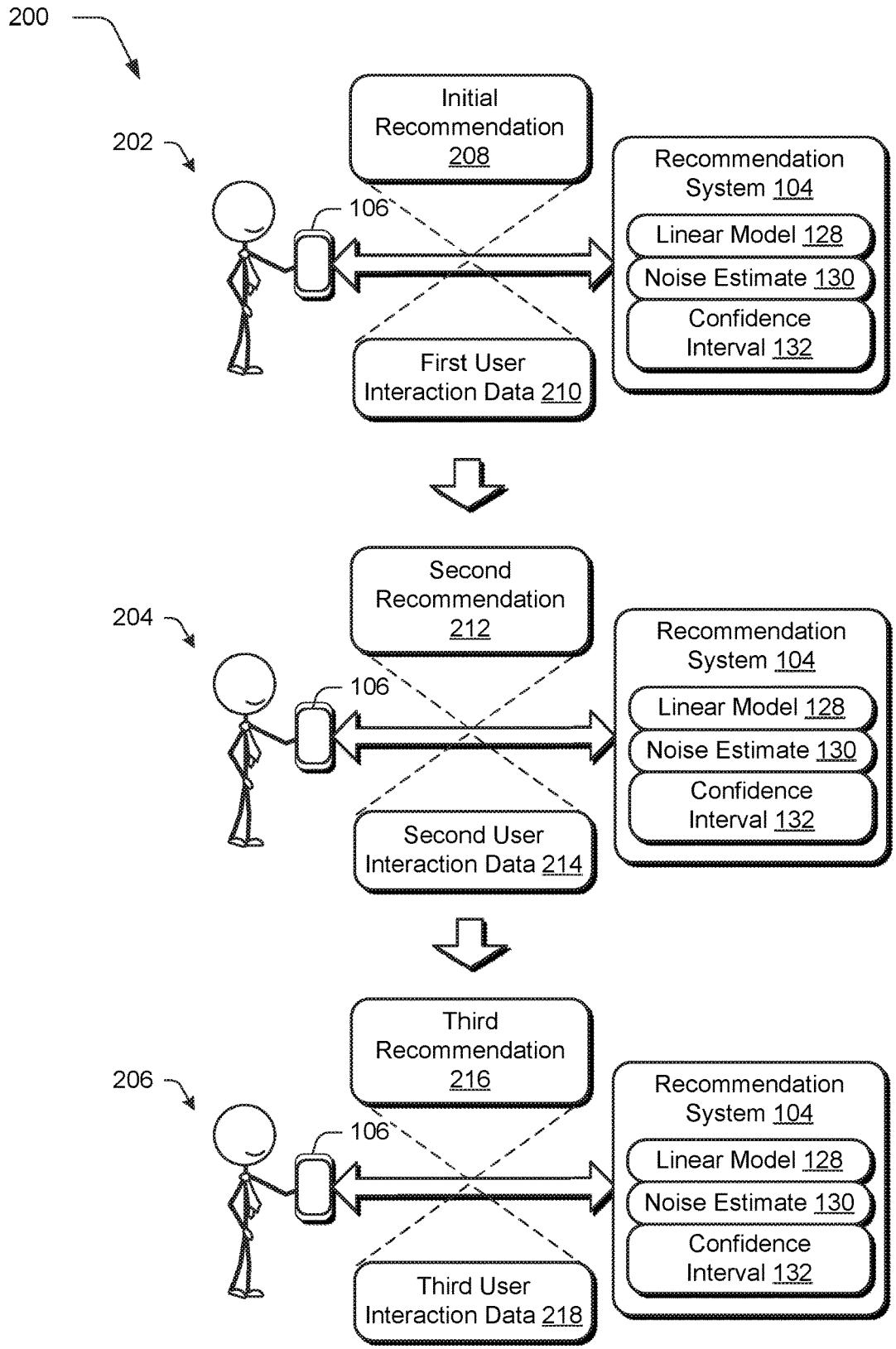
FIG. 2 depicts a system in an example implementation of successive generation of recommendations and refine of a linear model, noise estimate, and confidence interval based on user interface data generated to define a result of the recommendation.

In the techniques described herein, however, the noise estimate 130 is generated and refined as the user interaction data 114 is received, e.g., in real time. An example of this is shown in an example implementation 200 of FIG. 2 using first, second, and third stages 202, 204, 206. At the first stage 202, an initial recommendation is made based on an initial noise estimate 130 using the linear model. First user interaction data 210 is then received that describes a "result" of the recommendation, e.g., did the user interaction occur, an extent of the user interaction (e.g., amount of time an article is read, whether an advertisement was "clicked" as opposed to resulting in a direct purchase), and so forth.

At the second stage 204, the linear model 128, noise estimate 130, and confidence interval 132 is updated based on the first user interaction data 210. This serves as a basis by the recommendation system 104 to generate a second recommendation 212. In response, the second user interaction data 214 is received by the recommendation system 104 that describes the result of the second recommendation 212. The second user interaction data 214 is then used to update and refine the linear model 128, noise estimate 130, and confidence interval 132 as before. This process may continue by the recommendation system 104, e.g., for the third stage 206 to generate a third recommendation 216 and receive third user interaction data 218.

Thus, in this example, instead of being limited to an initial guess for noise as is required by conventional techniques, a noise estimate 130 may be made conservatively and further refined to learn a relationship between the features and the reward. The continued collection and processing of the user interaction data is used by the recommendation system 104 to refine the noise estimates 130 and confidence interval 132, i.e., amount of uncertainty of the estimates. As a result, the recommendation system 104 makes quicker and more fruitful progress toward receiving higher rewards and learning which features are to be used for predicting the rewards.

As described above, there are two parts to this: (1) generating the noise estimate; and (2) generating a confidence interval 132 indicating an amount of uncertainty of the noise estimate. This may be performed in a variety of ways, such as through linear regression in which past predictions and observed rewards are leveraged. This includes examining a difference between the predicted estimates of rewards made to generate the recommendations 124 and the user interaction data 110 describing an actual result of those recommendations on achieving the reward, i.e., the desired user interaction. A standard deviation described by this difference (e.g., a mean-square distance) is used as the noise estimate 130, because the noise estimate 130 is the part of the reward that cannot be explained, otherwise.

The recommendation manager module 122 also determines a confidence interval 132 for this noise estimate. The recommendation manager module 122, for instance, may use a technique involving self-normalizing Martingales that is used to estimate a quantity that is normalized by the inputs. This may be performed in a variety of ways, an example of which is described as "Improved Algorithms for Linear Stochastic Bandits" by Yasin Abbasi-Takhori et al, *In Proceedings of the 24$^{th}$ International Conference on Neural Information Processing Systems*, NIPS'11, pages 2312-2320, USA, 2011, Curran Associates Inc., the entire disclosure of which is hereby incorporated by reference.

The recommendation manager module 122 therefore employs a linear stochastic bandit technique that is based on confidence intervals 132 of a reward that is to be obtained by making a recommendation 124. To do so, the recommendation manager module 122, at any point in time, selects a choice from a number of choices (e.g., items of digital content 118) using a linear model 128 that is fit to user interaction data 110 to describe past user interactions. This is used to obtain an estimate of what the reward would be for each of the items of digital content 118. These estimates are then used to generate the recommendation, which may also take into account exploration and exploitation. In order for these choices to be meaningful, the confidence interval 132 is used to describe an amount of uncertainty in making the noise estimate 130, i.e., a likelihood of accuracy of the noise estimate 130.

In this way, the confidence interval 132 and noise estimate 130 define a confidence interval for the reward for each of the items of digital content 118. This enables the recommendation manager module 122 to generate the recommendation 124 as choosing which of the items has the highest upper bound in the reward of its confidence interval. As a result, the recommendation manager module 122 may make the most optimistic choice by looking at each option (i.e., item of digital content 118) and optimistically choose the one that has the highest potential of yielding a high reward. As that option is chosen, the reward is obtained and added to the user interaction data 110 to guide subsequent recommendation 124 generation.

Figure 3:
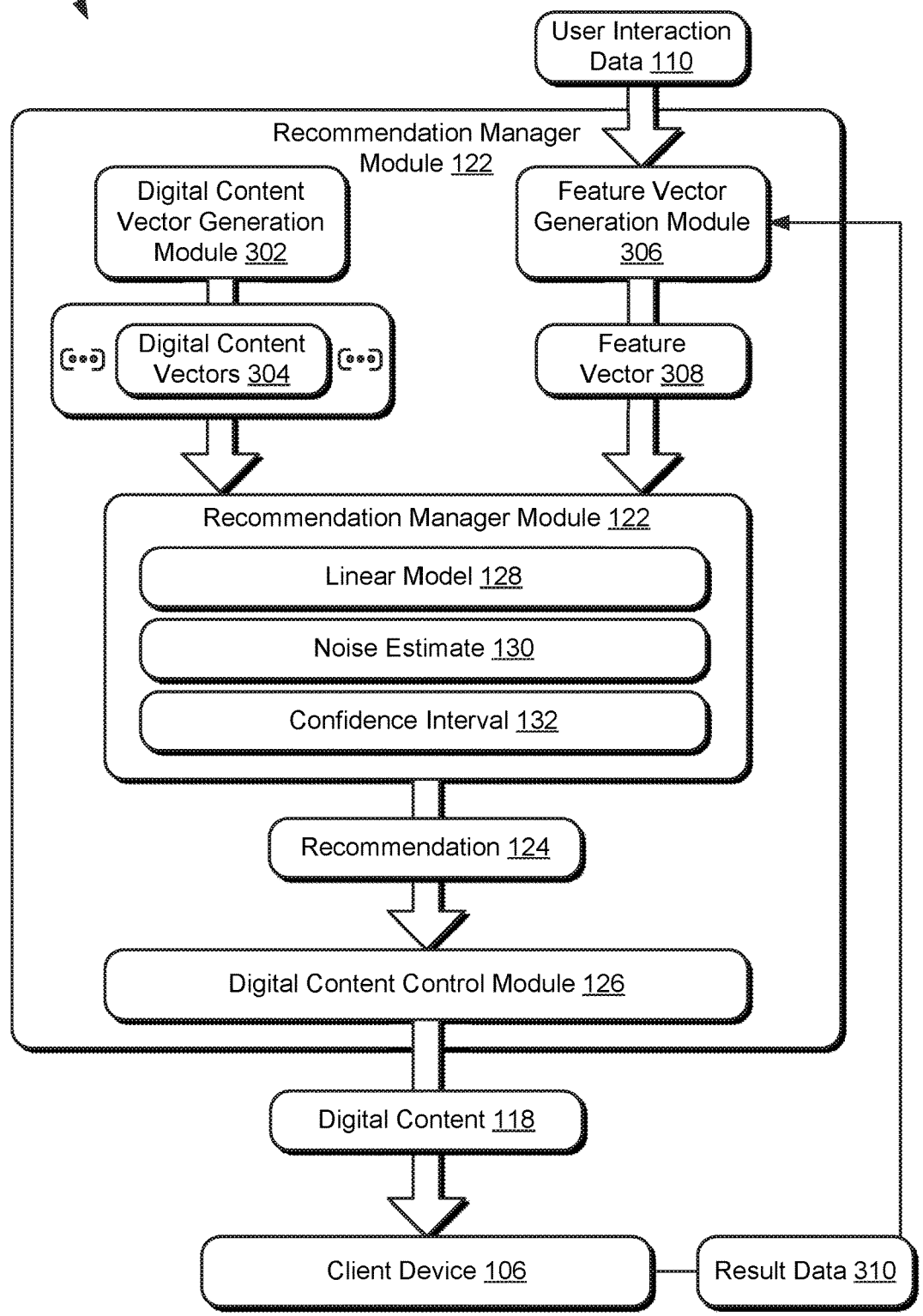
FIG. 3 depicts a system in an example implementation showing operation of the recommendation system of FIG. 1 in greater detail.

FIG. 3 depicts a system 300 showing operation of the recommendation manager module 122 of FIG. 1 in greater detail. In this example, the recommendation manager module 122 includes a digital content vector generation module 302 that is configured to generate digital content vectors 110 that represent digital content 118 that is to be subject of the recommendation 124. For example, suppose the digital content 118 includes a plurality of digital articles and the recommendation 124 describes which article is to be transmitted for display by the client device 106. The digital content vector generation module 302 is configured to generate the digital content vectors 110 having elements that reference characteristics of the article, e.g., a vector of one hundred elements in which the first element indicates how related the article is to sports, the second element indicates how related the article is to politics, and so on. As a result the digital content vectors 110 support numerical data in which each element has meaning in describing the digital content. Likewise, a feature vector generation module 306 is implemented to generate a feature vector 308 as a numerical representation of features of the user interaction data 110, e.g., to describe user interactions such as which interaction did or did not occur in relation to which items of digital content.

The digital content vectors 304 and feature vector 308 are them employed by the recommendation manager module 122 to generate a linear model 128 through linear regression. As part of this, a noise estimate 130 is generated along with a confidence interval 132 describing an amount of uncertainty for each of the items of digital content in cause a desired user interaction, e.g., conversion, reading an article for a specified amount of time, and so forth. The noise estimate 130, for instance, may be generated based on a mean square distance between an estimate of the reward and the actual rewards observed in the result data 310. Thus, the recommendation manager module 122 computes a likely "reward" for each of the items of digital content 118 and generates the recommendation 124 based on an amount of certainty of a noise estimate 130.

The recommendation manager module 122, for instance, may determine that an amount of uncertainty as defined by a noise estimate 130 for an item of digital content 118 is low. Thus, under exploitation the recommendation manager module 122 generates a recommendation 124 to cause the digital content control module 126 to expose that item of digital content 118 to the client device 106. In another instance, however, a confidence interval 132 for a noise estimate 130 may indicate a high level of uncertainty (e.g., over a threshold amount), thereby causing the recommendation manager module 122 to select a sub-optimal exploitation option in order to gain insight into the linear relationship through exploration.

Result data 310 indicating a result of the exposure of the digital content 118 to the client device 106 is then added to the user interaction data 110 and feature vector 308 to refine the linear model 128, noise estimate 130, and confidence interval 132. Thus, a next recommendation 124 may be generated based on how the user of the client device 106 responds to a previous recommendation. In this way, the recommendation manager module 122 may improve accuracy of the linear model 128, noise estimate 130, and confidence interval 132 over time and thus improve accuracy of the recommendation 124, which is not possible using conventional fixed approaches. Further discussion of this example is included in the following Implementation Example section.

Implementation Example

A multi-armed bandit technique is used to model the following recommendation system 104 problem. Suppose that a gambler is playing at a row of slot machines, and every time the gambler interacts with one, the slot machine issues a random reward drawn from a probability distribution. Since different machines may have different probability distributions over the rewards, the gambler wants to identify the best machine, i.e. the one with the highest expected reward. Ultimately, the goal of the gambler is to maximize total rewards. Therefore, a rational gambler intuitively starts by exploring different machines and gathering information. Then, as soon as the gambler is sufficiently confident of having identified the best operation, this option is exploit and the other options are discarded.

A linear stochastic bandit technique is a special variation of a mathematical formalization of a multi-armed bandit machine problem in which, at each iteration t and before making a decision, a gambler observes additional contextual information that may affect the outcome of the machines in obtaining a reward. Typically, this information is described as a d-dimensional feature vector $x_{t,j}$ for each machine j, upon which the expected outcome of the machines depends through an unknown linear function that does not change in time. That is, the gambler knows that there is some hidden and fixed d-dimensional parameter $\theta_*$ such that the expected reward of the j-th machine at time t is $\mathbb{E}[r_{t,j}] = \theta_*^T x_{t,j}$.

However, since the machines are random, if the gambler chooses the j-th machine at time t, the actual observed reward will be $r_{t,j} = \theta_*^T x_{t,j} + \epsilon_t$, where $\epsilon_t$ is a Gaussian random variable with zero mean and variance $R^2$. In this scenario, therefore, one absolute "best" machine does not exist. Instead, at each iteration the optimal choice for the gambler depends on the observed features $x_t$. If the gambler knew the value of $\theta_*$, the best choice may be easily made each time. As in the original multi-armed bandit, this problem presents a tradeoff between exploration and exploitation. At each iteration, the gambler has a guess $\hat{\theta}_t$ of what $\theta_*$ may be, and can choose to either pick the most promising machine based on $\hat{\theta}_t$ and the observed features x, i.e. exploit, or try a different machine that will help refine $\hat{\theta}_t$, i.e. explore. Intuitively, the optimal strategy takes into consideration the uncertainty around each guess $\hat{\theta}_t$. If the gambler is confident that the real $\theta_g$ (i.e. $\hat{\theta}_t = \theta_*$) has been identified, then the gambler intuitively picks the most promising machine, i.e. the machine with the largest $\mathbb{E}[r_{t,j}] = \hat{\theta}_t^T x_{t,j}$, over all possible j. Instead, if the gambler knows that the guess $\hat{\theta}_t$ may be inaccurate, the gambler refine the guess through exploration.

Thus, a strategy employed by recommendation systems 104 for the linear stochastic bandit problem involves, at each iteration, both an estimate $\hat{\theta}_t$ of $\theta_*$ and a quantification of its uncertainty of $\hat{\theta}_t$. One technique is to obtain an estimate $\hat{\theta}_t$ by regularized linear regression of the past observed rewards on the corresponding feature vectors. Formally, this may be written as follows, at a time t and indicated by $X \in \mathbb{R}^{t-1 \times d}$ the matrix whose t−1 rows are the feature vectors corresponding to each of the machines chosen before time t. Then, for some fixed value of the regularization parameter $\lambda > 0$, the following is defined:

$$\hat{\theta}_t = V_t^{-1} Xr; \quad V_t = X^T X + \lambda I,$$

where r indicates the t−1-dimensional vector of the rewards collected before time t and I is the d×d identity matrix.

The second ingredient in generating the confidence interval 132, i.e. an estimate of the uncertainty of $\hat{\theta}_t$ as an approximation of $\theta_*$ has increased complexity. Classical statistical tools of regression analysis do not apply here, since observations are not independent. Indeed, a realization is made herein, and not in conventional techniques, that the random noise $\epsilon_t$ at time t may affect all subsequent choices of the gambler, thus introducing a complex dependencies in the observations. For this reason, $\hat{\theta}_t$ may have higher variance than would be independently estimated.

Fortunately, rigorous mathematical tools for obtaining confidence regions for $\hat{\theta}_t$ have been previously developed as described in "Improved Algorithms for Linear Stochastic Bandits" by Yasin Abbasi-Takhori et al, *In Proceedings of the 24th International Conference on Neural Information Processing Systems*, NIPS'11, pages 2312-2320, USA, 2011, Curran Associates Inc., the entire disclosure of which is hereby incorporated by reference. From that work, a technique is formulated for this bandit problem, with a provable bound on the regret of the gambler, i.e. the cumulative difference between the rewards collected by the gambler and those of an oracle that knows the true value of $\theta_*$. That work achieves this by assuming a known upper-bound $R_0^2$ on the unknown true variance $R^2$ of the noise estimates. In the following, it is shown that $R^2$ can be estimated from the user interaction data 114 and thus supports an improved technique for a theoretical regret bound and improved practical performance, thereby improving operation of a computing device and recommendation system 104 that employs these techniques.

The linear stochastic bandit problem is particularly relevant in recommendation systems 104, such as to control output of digital content 118 including web advertisements, articles, and so on as previously described. As an example, consider the case in which the gambler is an automatic online recommendation system 104 making news article recommendations 124 to its users of associated client devices 106. At each time t, the recommendation system 104 receives a new user and must show one article, among the K available ones. Then, the recommendation system 104 will receive a reward proportional to the amount of time the user spends on that article (i.e. through ads).

Typically, the recommendation system 104 will have some information on the user, e.g. IP address, previous browsing history, the current time of day, and so on as user interaction data 114. Moreover, the recommendation system 104 has information on the content of the K articles, such as author, topic, length and key words. This contextual information about the combination of user and article, for each of the K articles, can be summarized in K different d-dimensional vectors by the recommendation system 104. Assuming, as a simple practical approximation, that the logarithm of the expected amount of time spent by the user on the page is a linear function of this contextual feature vector, this becomes the linear stochastic bandit problem described above.

Constructing Noise-Adaptive Confidence Intervals 132

A technique is now described in which the recommendation manager module 122 generates a confidence interval 132 (i.e., constructs valid confidence sets) for the linear coefficient vector $\theta_*$, using the data collected by a bandit technique and exploiting an online estimate of the noise variance. In the following, a Grammiam matrix $V_t$ at time t is defined as $V_t = X^T X + \lambda I$.

Proposition 1. Let $S_0$ be an upper bound on the signal amplitude $\|\theta\|_2$ and $R_0^2$ be an upper bound on the Gaussian noise variance $R = \mathbb{E}[\epsilon_t^2]$. Define also the matrix $Q = I - X V_t^{-1} X^T$. Then, for all $t > 0$, the quantity $\hat{R}_{t,\alpha}^2$ defined below is an $\alpha$-conservative estimate of $R^2$:

$$\hat{R}_{t,\alpha}^2 = \min\left\{ \zeta_{t,\alpha}\left(\frac{\|Qy\|_2^2}{t} + \xi_{t,\alpha}\right), R_0^2 \right\}$$

where $\xi_{t,alpha}$ and $\zeta_{t,\alpha}$ are defined as $$\xi_{t,alpha} = \frac{9\lambda S_0^2}{4t} + \frac{2R_0^2}{t} \log\left(\frac{\det V_t}{\alpha^2 \lambda^d}\right) + \frac{2\sqrt{\lambda S_0} R_0}{t} \sqrt{\log\left(\frac{\det V_t}{\alpha^2 \lambda^d}\right)},$$

$$\zeta_{t,\alpha} = \frac{t}{\chi^2_{t,\frac{\alpha}{2t^2}}}.$$

That is, with probability at least $1-\alpha$, for all $t > 0$, $\hat{R}_{t,\alpha}^2 \geq R^2$.

Proposition 2. Let $\sigma_{min}^2$ be the smallest eigenvalue of $$\frac{1}{t} X^T X.$$

For any $\delta > 0$, with probability at least $1-\delta$ for all $t \geq 0$, $\theta_*$ lies in the set $$C_t' = \left\{ \theta \in \mathbb{R}^d : \|\hat{\theta}_t - \theta\|_{V_t} \leq \hat{R}_{t,\delta/2} \sqrt{\log\left(\frac{4 \det V_t}{\delta^2 \lambda^d}\right)} + \frac{\lambda S_0}{\sqrt{\lambda + t\sigma_{min}^2}} \right\}.$$

Regret Analysis

An upper bound is now generated on the regret of an OFUL technique as described in "Improved Algorithms for Linear Stochastic Bandits" by Yasin Abbasi-Takhori et al, *In Proceedings of the 24th International Conference on Neural Information Processing Systems*, NIPS'11, pages 2312-2320, USA, 2011, Curran Associates Inc. with the confidence sets defined in Section 2.

Proposition 3. Assume that for all $t > 0$ and all $x \in D_t$, $\langle x, \theta \rangle \in [-1,1]$. Then, with probability at least $1-\delta$, the regret of the modified OFUL technique that uses the confidence ellipsoids from Proposition 2 satisfies for all $t > 0$ as follows:

$$R_t \leq 4\sqrt{td \log(\lambda + tL/d)}$$

$$\left(\sqrt{\lambda S_0} + \left(R + c\sqrt{\frac{\log t}{t}}\right)\sqrt{2\log(2/\delta) + d\log[1 + tL/(\lambda d)]}\right)$$

for some appropriate constant c.

The regret bound in this example is the R term as a true noise level (which may be unknown) and not its conservative upper bound $R_0$ as in the referenced word above. The constant c does depend on $R_0$, however, a conservative value of $R_0$ may now be chose without paying any price asymptotically, since c is multiplied by $\sqrt{(\log t)/t}$.

Even though this discussion focuses on the estimation of the noise variance, the confidence interval are also better than conventional techniques from the point of view of the signal level S. The regret bound still depends on a conservative estimate $S_0$ of S, but the practical performance of the techniques described herein are significantly better than that whenever all the eigenvalues of $V_t$ are large. For simplicity, suppose that the true noise level R is known. Thus, confidence intervals as computed herein are always at least as accurate (i.e., tight) as the ones in the referenced work above and in some cases are significantly more accurate. Suppose that $X_{t,\cdot} \stackrel{i.i.d.}{\sim} N(0, I)$. Then, $d_i^2$ are the eigenvalues of the (unscaled) empirical covariance matrix $X^T X$ and thus approximately $d_i^2 \approx n$. Therefore, in this case the confidence regions scale asymptotically as follows:

$$\|\hat{\theta} - \theta_*\|_{V_t} \approx R \sqrt{\log\left(\frac{4 \det V_t}{\delta^2 \lambda^d}\right)} + \frac{\lambda S_0}{n}.$$

This means that if "good" features are observed, then after some subsequent time the initial upper bound $S_0$ is no longer used.

Figure 4:
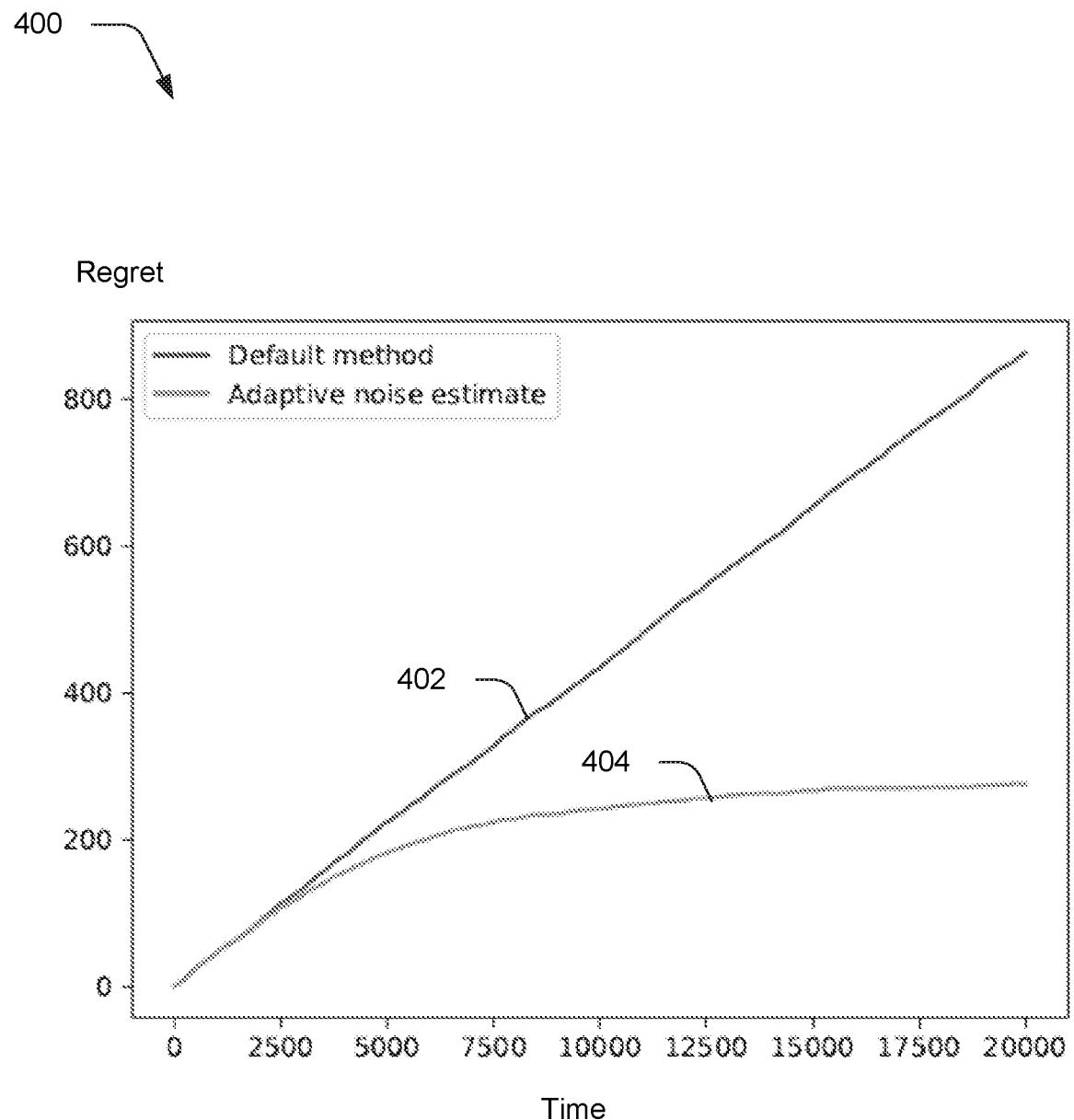
FIG. 4 depicts a graph that contrasts conventional results of a conventional technique with results of adaptive noise estimation techniques described herein.

FIG. 4 depicts a graph 400 that contrasts conventional results 402 of a conventional technique 402 with results 404 of the adaptive noise estimate techniques described herein. To generate these results, a dataset of 10,000 tagged images is obtained by the recommendation system 104. For each image, the dataset contains an appreciation percentage (the arm reward) and 50 descriptive features (contextual information) extracted by fitting a latent Dirichlet allocation model with 110 topics on the tags and then extracting the top 50 principal components. A linear bandit problem is simulated with twenty arms by randomly selecting at each round twenty images with replacement, and then identifying the image with the highest appreciation percentage. The regret of the bandit algorithm is computed relative to that of the best linear regressor trained on the entire dataset. As compared, a conservative noise estimate of $R_0^2 = 0.25$ as part of a conventional technique is compared with use of that same estimate, initially, with the adaptive techniques described herein. As illustrated, the techniques described herein exhibit significant performance improvement over conventional techniques, e.g., the referenced work above.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
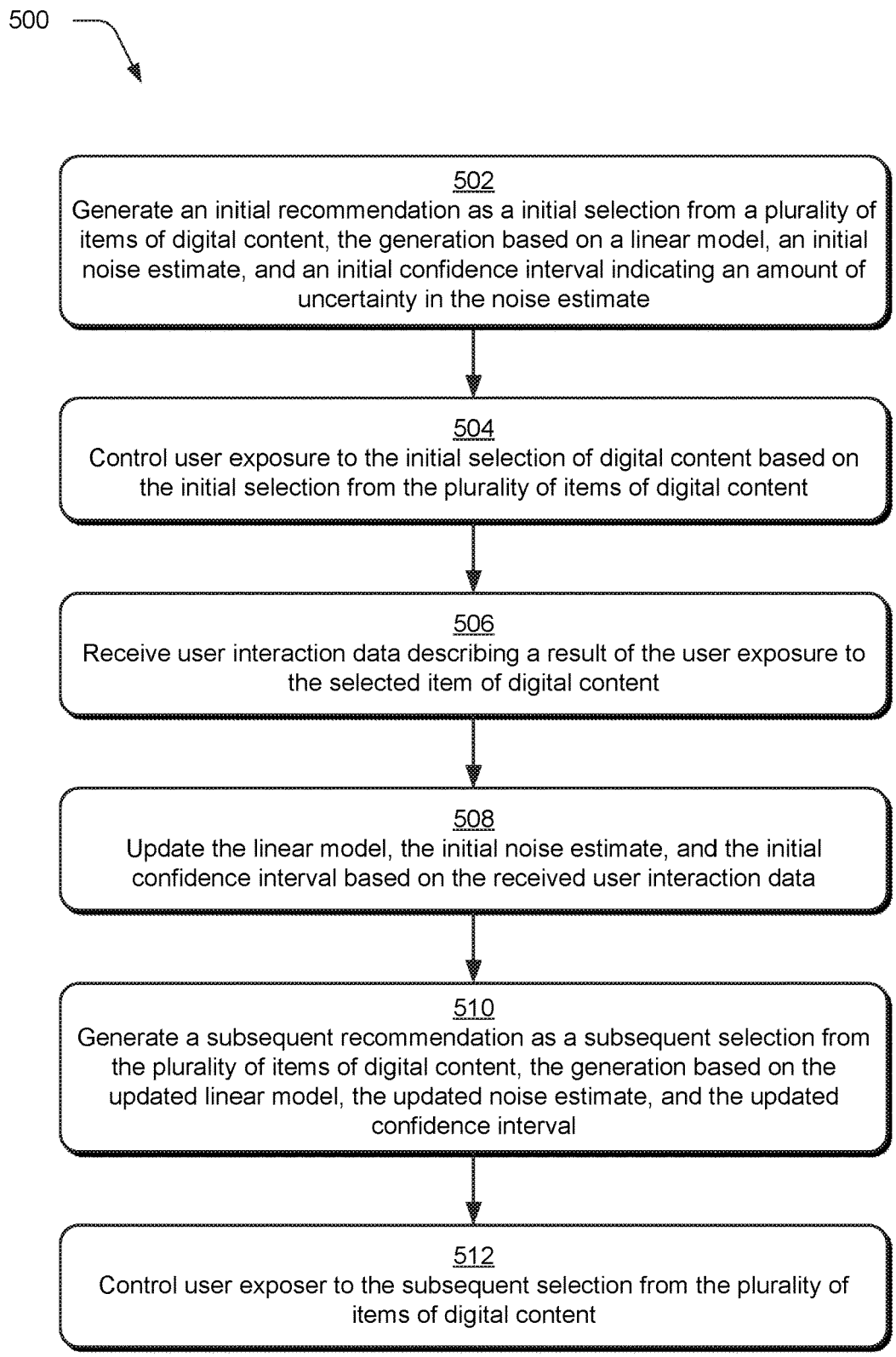
FIG. 5 is a flow diagram depicting a procedure in an example implementation in which a confidence interval is generated and refined as part of a linear stochastic bandit technique to generate a recommendation of digital content by a recommendation system.

FIG. 5 depicts a procedure 500 in an example implementation in which a confidence interval is generated and refined as part of a linear stochastic bandit technique to generate a recommendation of digital content by a recommendation system. An initial recommendation is generated by the recommendation system as an initial selection from a plurality of items of digital content. The generation of the recommendation is based on a linear model, an initial noise estimate, and an initial confidence interval indicating an amount of uncertainty in the noise estimate (block 502). The plurality of items of digital content 118, for instance, may be configured as digital marketing content, digital audio, digital video, digital images, and so forth. Thus, the recommendation 124 serves to identify which of these items are to be exposed to a user of the client device 106 based on a notion of a "reward" to cause user interaction with the item.

User exposure is then controlled by a digital content control module 126 of the recommendation system 104 to the initial selection from the plurality of items of digital content 118 (block 504). This may include providing an advertisement on a webpage, a recommendation of a digital article to be read, digital video to watch, and so on.

User interaction data is then received by the recommendation system 104 describing a result of the user exposure to the initial selection (block 506) of the digital content 118. The result, for instance, may specify whether a desired user interaction occurred (e.g., conversion), an amount of the user interaction (e.g., how much of an article is read), and so forth.

The recommendation manager module 122 then updates the linear model, the initial noise estimate, and the initial confidence interval based on the received user interaction data (block 508). The recommendation manager module 122, for instance, may refit the linear model 128 based on user interaction used to generate the initial linear model and the user interaction collected as a result of the initial recommendation. A noise estimate 130 and confidence interval 132 are also updated based on a comparison of a predicted outcome (e.g., the predicted reward) and an observed actual result.

A subsequent recommendation is generated by the recommendation manager module 122 as a subsequent selection from the plurality of items of digital content, the generating based on the updated linear model, the updated noise estimate, and the updated confidence interval (block 510). User exposure is controlled by a digital content control module 126 to the subsequent selection from the plurality of items of digital content 118 (block 512). In this way, the recommendation manager module 122 may set and refine the noise estimate 130 and confidence interval 132, which is not possible using conventional techniques.

Example System and Device

Figure 6:
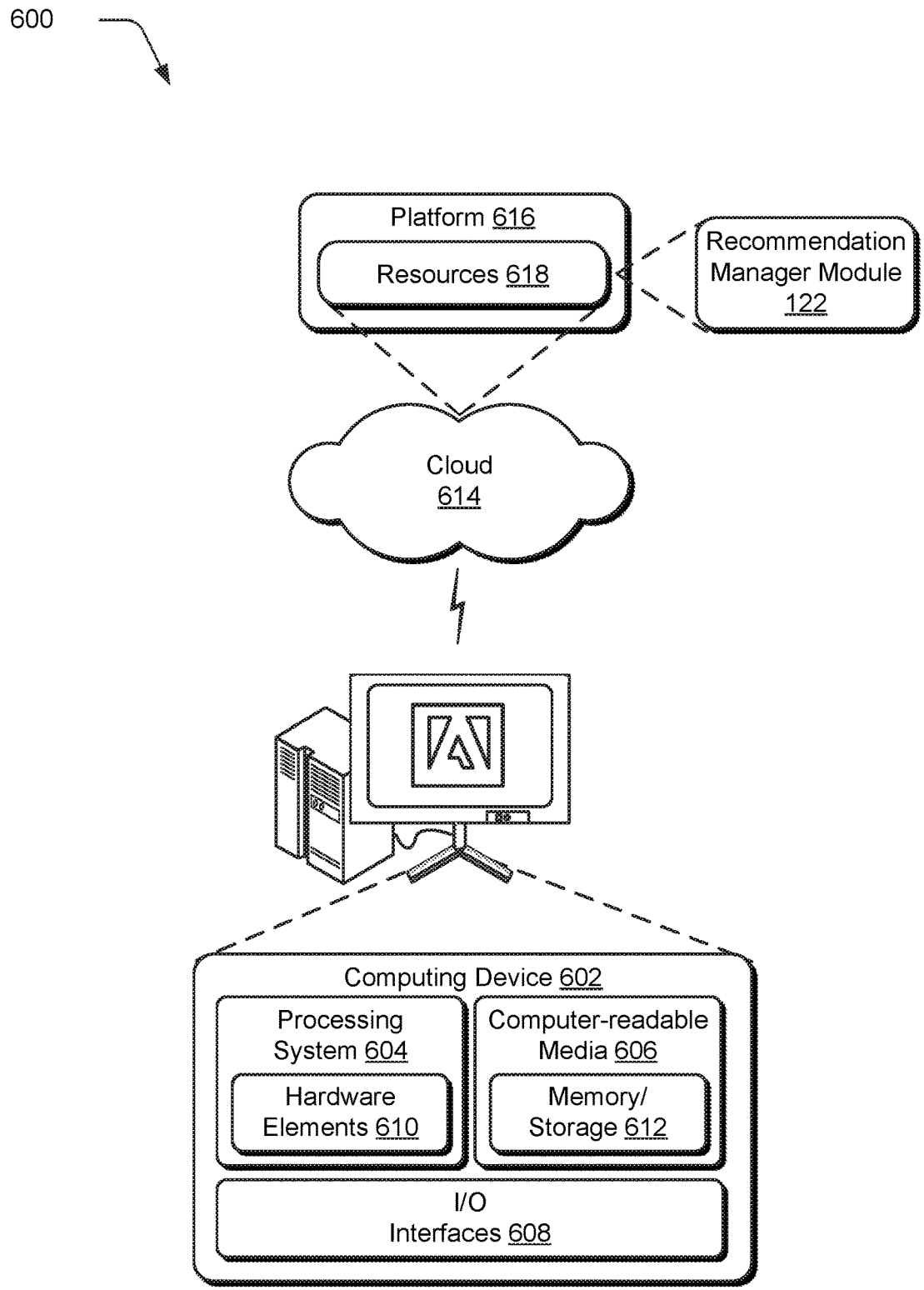
FIG. 6 illustrates an example system including various components of an example device that can be implemented as any type of computing device as described and/or utilize with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. This is illustrated through inclusion of the recommendation manager module 122. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium recommendation environment, a method implemented by at least one computing device, the method comprising:
    generating, by a digital content vector generation module of the at least one computing device, a plurality of digital content vectors describing a plurality of items of digital content, respectively;
    generating, by a feature vector generation module of the at least one computing device, a feature vector based on user interaction data collected via a network describing user interaction and an extent of the user interaction with respective said digital content as occurring locally on respective client devices;
    generating, by a recommendation manager module of the at least one computing device, recommendations as selections from the plurality of items of digital content, the generating based on a linear model, a noise estimate, a confidence interval indicating an amount of uncertainty in the noise estimate, the plurality of digital content vectors, and the feature vector;
    receiving, by the at least one computing device, subsequent user interaction data collected over a plurality of iterations via the network from the respective client devices, the subsequent user interaction data describing a result and an extent of user exposure locally at the respective client devices to the selections from the plurality of items of digital content;
    generating, by the feature vector generation module of the at least one computing device, updated feature vectors for each of the plurality of iterations, respectively, based on the subsequent user interaction data collected over the plurality of iterations;

updating, by the recommendation manager module of at least one computing device, the linear model, the noise estimate, and the confidence interval based on the received user interaction data over the plurality of iterations; and controlling, by a digital content control module of the at least one computing device, output of subsequent digital content over the network to the client devices based on subsequent recommendations generated over the plurality of iterations based on the updated linear model, the updated noise estimate, the updated confidence interval, the plurality of digital content vectors, and the updated feature vector.

2. The method as described in claim 1, further comprising generating the linear model using linear regression based on past user interaction data that describes past user interactions with the plurality of items of digital content and wherein the updating of the linear model is generated based on the past user interaction data and the received user interaction data using linear regression, the updated noise estimate describes a random component of the updated linear model, and the confidence interval defines an amount of uncertainty that a true noise value is included within the updated noise estimate.

3. The method as described in claim 1, further comprising generating the noise estimate by calculating a difference between predicated estimates of user interactions and observed user interactions.

4. The method as described in claim 3, wherein the calculating of the difference is a mean-square distance.

5. The method as described in claim 1, further comprising generating the confidence interval using self-normalizing Martingales.

6. The method as described in claim 1, wherein the generating of the subsequent recommendation is based on which of the items of digital content has a highest upper bound in a respective confidence interval.

7. The method as described in claim 1, wherein the plurality of items of digital content are configured as digital marketing content.

8. The method as described in claim 7, wherein the received user interaction data indicates whether the selection resulted in conversion.

9. The method as described in claim 1, wherein the plurality of items of digital content are configured as digital article, digital video, or digital audio.

10. The method as described in claim 7, wherein the received user interaction data indicates whether the selection of digital content is consumed by a respective said client device that receives the selection of digital content as a result of the controlling.

11. In a digital medium recommendation environment, a recommendation system comprising:

a recommendation manager module implemented at least partially in hardware of at least one computing device to:

collect user interaction data via a network describing user interaction and an extent of the user interaction as occurring locally on respective client devices;

generate a recommendation based on the user interaction data as a selection from a plurality of items of digital content, the generating based on a linear model, a noise estimate, and a confidence interval indicating an amount of uncertainty in the noise estimate;

update the linear model, the noise estimate, and the confidence interval over a plurality of iterations based on a plurality of subsequent user interaction data collected via the network from the client device over the plurality of iterations that describes user interaction and an extent of the user interaction as occurring locally on the respective client devices; and generate recommendations as selections from the plurality of items of digital content over the plurality of iterations, the generating based on the updated linear model, the updated noise estimate, and the updated confidence interval; and a digital content control module implemented at least partially in the hardware of the at least one computing device to control user exposure at the client devices via the network to the selections based on the recommendations.

12. The system as described in claim 11, wherein the linear model is generated using linear regression based on past user interaction data that describes past user interactions with the plurality of items of digital content.

13. The system as described in claim 11, wherein the noise estimate is generated by calculating a difference between predicated estimates of user interactions and observed user interactions.

14. The system as described in claim 13, wherein the calculating of the difference is a mean-square distance.

15. The system as described in claim 11, wherein the confidence interval is generated using self-normalizing Martingales.

16. The system as described in claim 11, wherein the generating of the subsequent recommendation is based on which of the items of digital content has a highest upper bound in a respective confidence interval.

17. In a digital medium recommendation environment, a system comprising:

means for generating recommendations as selections from a plurality of items of digital content, automatically and without user intervention, the generating based on a linear model, a noise estimate, and confidence interval indicating an amount of uncertainty in the noise estimate;

means for updating the linear model, the noise estimate, and the confidence interval automatically and without user intervention over a plurality of iterations based on user interaction data that is collected over a network from client devices over the plurality of iterations, the user interaction data describing user interaction and an extent of the user interaction as occurring locally on respective client devices with the plurality of items of digital content;

means for generating recommendations over the plurality of iterations, automatically and without user intervention, as selections from the plurality of items of digital content, the generating based on the updated linear model, the updated noise estimate, and the updated confidence interval; and means for controlling output of the selections from the plurality of items of digital content via the network to the client devices.

18. The system as described in claim 17, wherein the plurality of items of digital content are configured as digital marketing content.

19. The system as described in claim 18, wherein the user interaction data indicates whether the digital marketing content resulted in conversion.

20. The system as described in claim 18, wherein the plurality of items of digital content are configured as digital article, digital video, or digital audio.

* * * * *